Nov. 4, 1947.　　G. L. HAMRE　　2,430,112
FISHING ROD HOLDER
Filed Sept. 21, 1945　　2 Sheets-Sheet 1
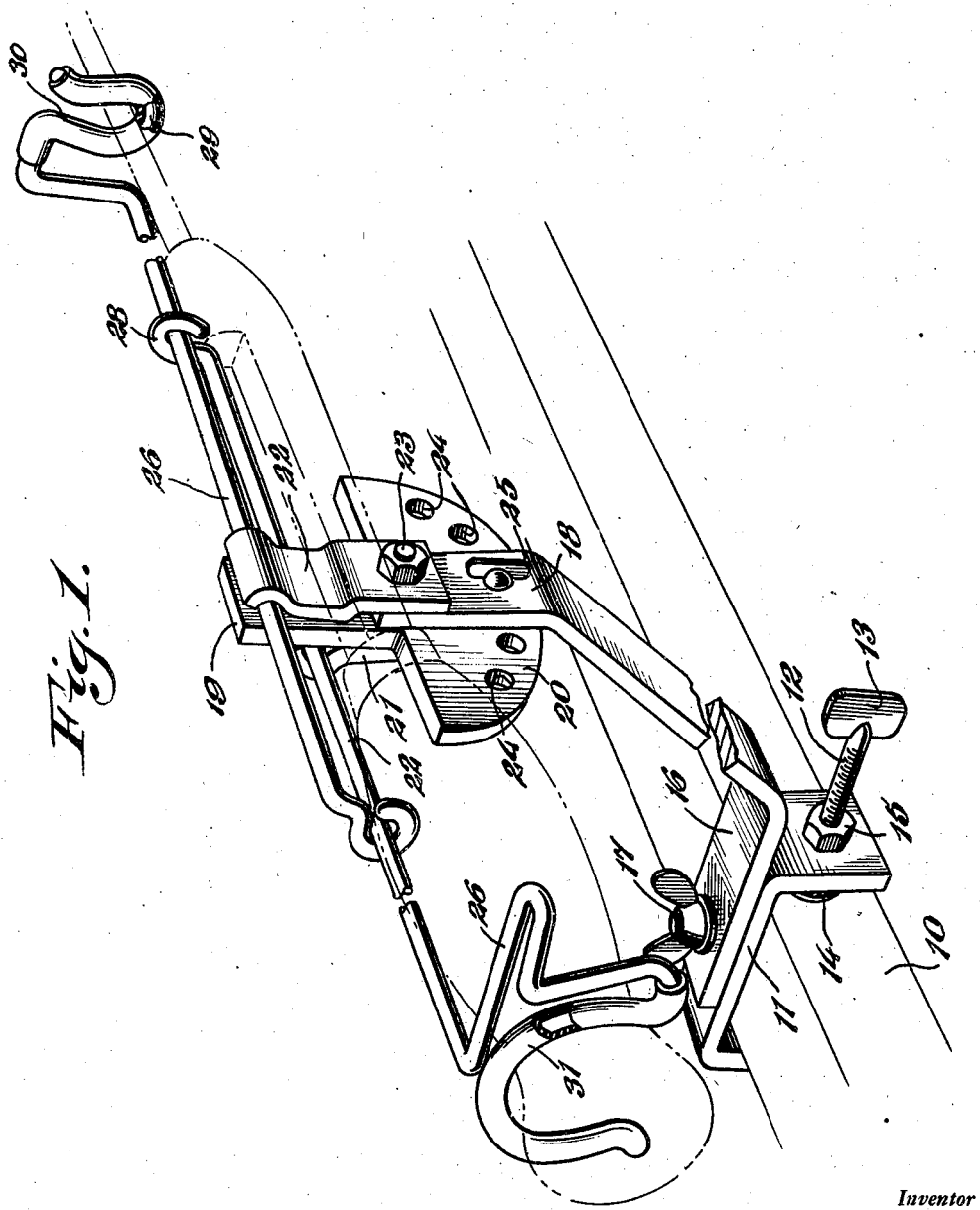
Inventor
GLENN L. Hamre
By Clarence A. O'Brien
and Harvey B. Jacobson
Attorneys

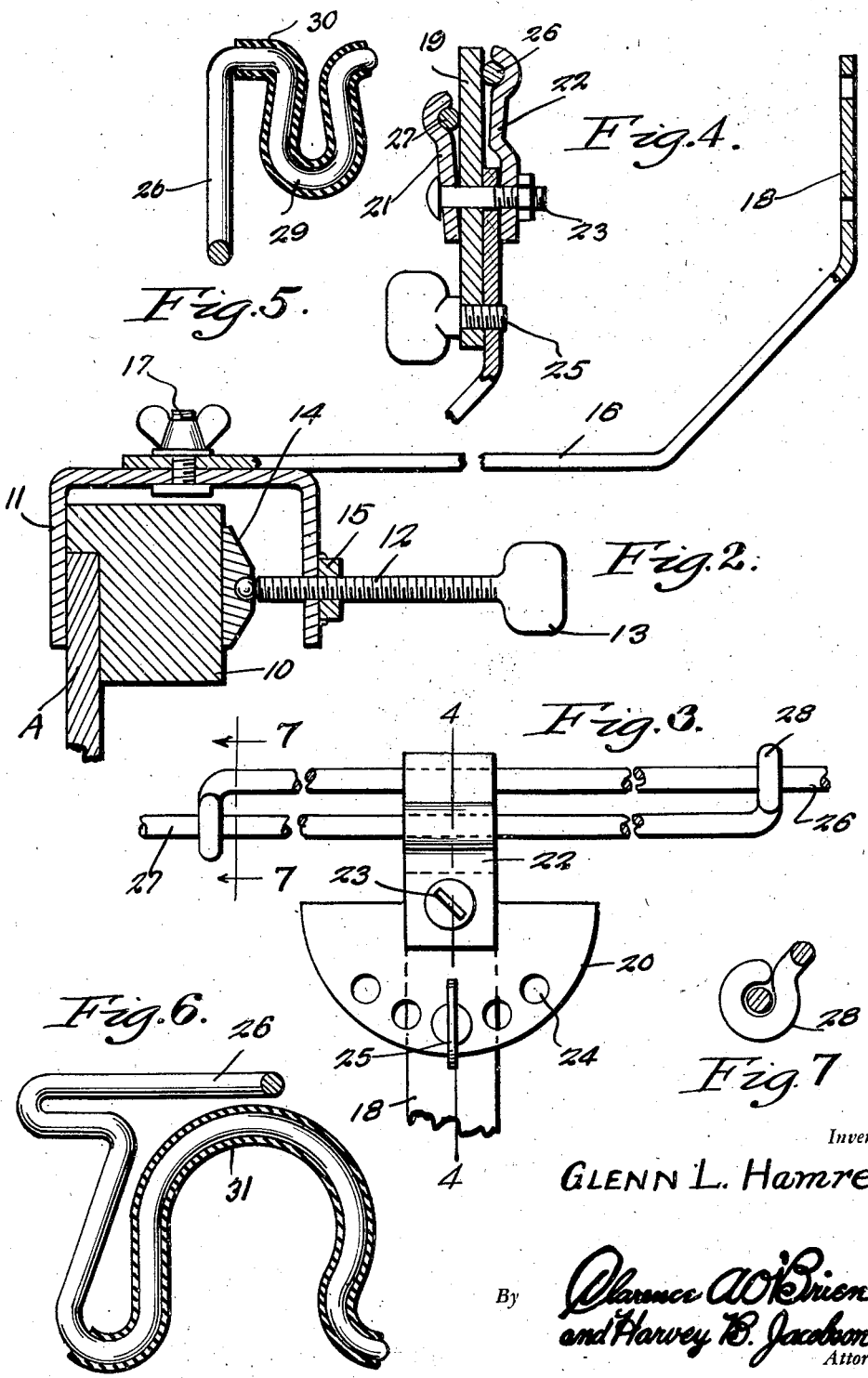

Patented Nov. 4, 1947

2,430,112

UNITED STATES PATENT OFFICE 2,430,112

FISHING ROD HOLDER

Glenn L. Hamre, Billings, Mont.

Application September 21, 1945, Serial No. 617,846

2 Claims. (Cl. 248—42)

The invention relates to a fishing rod supporting device, and more especially to a rod holder for a fisherman's use.

The primary object of the invention is the provision of a device of this character for use in fishing from a boat as by trolling, so that the necessity for the holding of the rod by hand is entirely eliminated, and the rod is supported on the boat at the required angle of approximately forty-five degrees or any other desired angle, from the center line of the boat and toward the stern thereof.

A further object is the provision of such a device which is adaptable for varying sizes of standard fishing rods, which will accommodate heavy fishing rods, such as those used in ocean trolling and which will also accommodate light weight fishing rods such as are used in lake fishing.

A further object is to provide such a device which will allow a fisherman in a boat more freedom of action and the use of both hands for the numerous small tasks always presenting themselves during a fishing expedition.

Another object of the invention is the provision of a holder of this character, which may be readily folded, and which may be assembled after the fisherman has entered the boat, which is susceptible of vertical adjustment, as well as horizontal adjustment, and which by its positioning eliminates the possibility of the fisherman tripping over the rod when lying in the bottom of the boat, thus avoiding the possibility of falling out of the boat or tipping the same over.

A further object of the invention is the provision of a holder of this character permitting the assembly and dissembly of the rod therewith with a minimum of effort and difficulty.

A still further object of the invention is the provision of a holder of this character, which is extremely simple in construction, reliable and efficient in operation, strong, durable, readily and easily adjusted, convenient for application and removal to and from a boat or other support, neat in appearance, readily accessible, and inexpensive to manufacture and install.

With these and other objects in view, the invention consists in the features of construction and combination and arrangement of parts, as will be hereinafter more fully described and illustrated in the accompanying drawing, which discloses the preferred embodiment of the invention, and pointed out in the claims hereunto appended.

In the accompanying drawing:

Figure 1 is a perspective view of this improved fishing rod holder, illustrating a fishing rod in broken lines supported therein.

Figure 2 is a fragmentary side elevation, partly broken away of the holder constructed in accordance with the invention shown as applied to the gunwale of a boat in fragmentary section.

Figure 3 is a fragmentary elevation of a portion of the device showing the adjustable clamp thereon.

Figure 4 is a fragmentary sectional view taken approximately on the line 4—4 of Figure 3.

Figure 5 is a fragmentary elevation partly in section of one of the retaining saddles for the fishing rod.

Figure 6 is a view similar to Figure 5 showing the other of the saddling portions of the device.

Figure 7 is a fragmentary sectional view taken on the line 7—7 of Figure 3 looking in the direction of the arrows.

Similar reference characters indicate corresponding parts throughout the several views in the drawing.

Referring to the drawing in detail A designates generally a portion of the gunwale of a fisherman's boat of standard construction, having an outboard facing 10 as usual. Adapted to be applied to the gunwale A is the device or holder constituting the present invention, which comprises an inverted substantially U-shape clamping yoke 11 which is designed to straddle over the gunwale A and on either the innermost or outermost arm of this yoke is fitted a set screw 12 having an outer winged head 13. Swivelled to such screw is a binding plate or disk 14 so that the screw 12 tapped in the fitting 15 can detachably secure the yoke 11 upon the gunwale A, as best seen in Figure 1 of the drawing.

On the yoke 11 is mounted an arm 16, which is adjustably fastened thereto by a binding bolt 17. Arm 16 is formed with an upwardly bent standard or elbow extension 18 which has swingingly connected thereto a double clamp including a shank 19 joined with a segmental-shaped ear or wing 20 at its lower extremity, while at opposite sides of the shank 19 are dual clamping clips 21 and 22, respectively. The clips 21 and 22 are held fast by a securing bolt 23 which constitutes the pivot 19 and engaged therein. The wing or ear 20 is designed for selective engagement with anyone of a group of spaced arcuately disposed apertures 24 of a locking screw 25 tapped into the standard 18 for the angular fitting of said shank with respect to the vertical.

Engageable by the clips 21 and 22 are sections 26 and 27, respectively, of an interlinked extensible and contractible fishing rod saddling member, the link connections between the sections 26 and 27 being indicated at 28 through eye terminals bent from such sections. On the outer end of the section 26 is formed a rest hook 29 having a protective covering 30 and into which is engaged the fishing pole or rod (not shown), while on the section 27 at the outer end thereof is built an inverted substantially hook-like bridging clip 31 which is designed to receive the handle end portion of the fishing rod or pole for saddling the same when the pole or rod is seated in the hook 29 where it becomes fulcrumed and held in fishing position for cradle support thereof.

The fishing rod or pole can be located at any desired degree of slant through adjustment of the ear or wing 20 and the sections 26 and 27 can be adjusted relative to each other for the proper accommodation of the fishing rod in the cradling thereof according to the size of such rod or pole. The sections 26 and 27 are held fast in adjusted position by the clips 21 and 22 and also in a supporting condition for the fishing rod or pole. The fishing rod or pole can be readily and quickly removed from the holder or device which a fish strikes so as to avoid loss of the catch.

From the foregoing it is thought that the construction and manner of operation of the device will be clearly understood and, therefore, a more extended explanation has been omitted for the sake of brevity.

From the foregoing it will now be seen that there is herein provided a device accomplishing all the objects of this invention, and others, including many advantages of great practical utility and commercial importance.

As many embodiments may be made of the inventive concept, and as many modifications may be made in the embodiment herein shown and described it is to be understood that all matter herein is to be interpreted merely as illustrative and not in a limiting sense.

What is claimed is:

1. A device of the kind described, comprising a clamping member for securing the device to a support, an arm pivotally connected to said member and having an upstanding standard, a shank pivoted to the standard for angular swinging movement relative thereto, means for fastening the shank in different adjusted positions on the standard, clips attached to the shank and carried by the pivotal connection thereof with the standard, an interlinked extensible sectional piece engaged by said clips, a saddle hook at the outer end of one of the sections of said piece, and a bridging terminal at the outer end of the other section of said piece.

2. A device of the kind described, comprising a clamping member for securing the device to a support, an arm pivotally connected to said member and having an upstanding standard, a shank pivoted to the standard for angular swinging movement relative thereto, means for fastening the shank in different adjusted positions on the standard, clips attached to the shank and carried by the pivotal connection thereof with the standard, an interlinked extensible sectional piece engaged by said clips, including an interlinking portion formed from the section of said extensible piece and slidably connecting the sections together, a saddle hook at the outer end of one of the sections of said piece, and a bridging terminal at the outer end of the other section of said piece.

GLENN L. HAMRE.

REFERENCES CITED

The following references are of record in the file of this patent:

UNITED STATES PATENTS

| Number | Name | Date |
|---|---|---|
| 2,236,070 | Rohrdanz | Mar. 25, 1941 |